US012802293B2

(12) United States Patent
Olson

(10) Patent No.: US 12,802,293 B2
(45) Date of Patent: Nov. 17, 2026

(54) POSTERIZED (PALETTE-BASED) TEXT-TO-TEXTURE

(71) Applicant: Sony Interactive Entertainment LLC, San Mateo, CA (US)

(72) Inventor: Joseph Logan Olson, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 121 days.

(21) Appl. No.: 18/623,979

(22) Filed: Apr. 1, 2024

(65) Prior Publication Data

US 2025/0308092 A1 Oct. 2, 2025

(51) Int. Cl.
*G06T 11/10* (2026.01)

(52) U.S. Cl.
CPC .................................... *G06T 11/10* (2026.01)

(58) Field of Classification Search
CPC ..................................................... G06T 11/001
See application file for complete search history.

(56) References Cited

U.S. PATENT DOCUMENTS

| | | | |
|---|---|---|---|
| 11,562,597 | B1 | 1/2023 | Kim |
| 11,769,017 | B1 | 9/2023 | Gray et al. |
| 2012/0210203 | A1 | 8/2012 | Kandekar et al. |
| 2019/0304008 | A1 | 10/2019 | Cen et al. |
| 2020/0210540 | A1 | 7/2020 | Bala et al. |
| 2020/0226474 | A1 | 7/2020 | Fidler et al. |
| 2021/0082159 | A1 | 3/2021 | Shugrina et al. |
| 2021/0295822 | A1 | 9/2021 | Tomkins et al. |
| 2022/0189104 | A1 | 6/2022 | Wetzstein et al. |
| 2022/0237879 | A1 | 7/2022 | Wu et al. |
| 2022/0383035 | A1 | 12/2022 | Saad et al. |
| 2023/0012372 | A1 | 1/2023 | Saha et al. |
| 2023/0343333 | A1 | 10/2023 | Tunstall-Pedoe et al. |
| 2024/0112403 | A1 | 4/2024 | Olson et al. |
| 2024/0115954 | A1 | 4/2024 | Olson et al. |
| 2025/0005859 | A1 | 1/2025 | Olson et al. |
| 2025/0307567 | A1 | 10/2025 | Olson |
| 2025/0308162 | A1 | 10/2025 | Olson |

OTHER PUBLICATIONS

Liu et al.—"Soft Rasterizer: A Differentiable Renderer for Image-based 3D Reasoning", 2019. Available at: [https://arxiv.org/pdf/1904.01786] (Year: 2019).*

Hou et al.—"Learning to Structure an Image with Few Colors", 2020. Available at: [https://arxiv.org/pdf/2003.07848] (Year: 2020).*

(Continued)

*Primary Examiner* — Daniel F Hajnik
*Assistant Examiner* — Adeel Bashir
(74) *Attorney, Agent, or Firm* — Fish & Richardson P.C.

(57) ABSTRACT

A neural texturing model, instead of employing a three channel RGB value, uses a value-per-color palette, with the highest value at any spot determining which color is selected. Also, the color palette can be made to be a trainable parameter so the palette is also generated. Thus, a learned palette of colors is used and a selection from that palette is made for each point on the model.

14 Claims, 4 Drawing Sheets

(56) References Cited

OTHER PUBLICATIONS

Ding et al.—"CogView: Mastering Text-to-Image Generation via Transformers", 2021. Available at: [https://proceedings.neurips.cc/paper/2021/file/a4d92e2cd541fca87e4620aba658316d-Paper.pdf] (Year: 2021).*
Yoo et al.—"GIFnets: Differentiable GIF Encoding Framework", 2020. Available at: [https://openaccess.thecvf.com/content_CVPR_2020/papers/Yoo_GIFnets_Differentiable_GIF_Encoding_Framework_CVPR_2020_paper.pdf] (Year: 2020).*
International Search Report and Written Opinion in International Appln. No. PCT/US2025/021856, mailed on Jun. 20, 2025, 9 pages.
Ren et al., "Make-A-Character: High Quality Text-to-3D Character Generation within Minutes," CoRR, Submitted on Dec. 24, 2023, arXiv:2312.15430v1, 7 pages.
Wu et al., "Text-Guided 3D Face Synthesis—From Generation to Editing," CoRR, Submitted on Dec. 1, 2023, arXiv:2312.00375v1, 18 pages.
Zhou et al., "Ultravatar: A realistic animatable 3d avatar diffusion model with authenticity guided textures," CoRR, Submitted on Jan. 20, 2024, arXiv:2401.11078v1, 15 pages.
Qin et al., "Diffusiongpt: LLM-Driven Text-to-Image Generation System," CoRR, Submitted on Jan. 18, 2024, arXiv:2401.10061v1, 10 pages.
Vimpari et al., ""An Adapt-or-Die Type of Situation": Perception, Adoption, and Use of Text-to-Image-Generation AI by Game Industry Professionals." Proceedings of the ACM on Human-Computer Interaction, Oct. 4, 2023, vol. 7, Issue CHI PLAY, pp. 131-164.

* cited by examiner

POSTERIZED (PALETTE-BASED) TEXT-TO-TEXTURE

FIELD

The present application relates generally to posterized (or palette-based) Text-to-Texture techniques.

BACKGROUND

A 3D neural radiance field (NeRF) may be thought of as a 3D volume stored in a machine learning (ML) model. As understood herein, the ML model can be trained to receive text descriptions of a desired object and in response produce images of objects such as characters and their accoutrements for computer simulations such as computer games. Once a NeRF has been produced it must typically be converted to a mesh for use in computer simulations.

SUMMARY

As also understood herein, when generating a texture for a 3D model, for example, using a NeRF, it may be desirable to constrain the texture to a set color palette (rather than full spectrum RGB). Present principles understand that this enables various advantages, including limiting the model's ability to 'bake in' lighting and other undesired artifacts. Another advantage of limiting a texture to a set color palette is to enable changing the color-set (e.g., if it is desired make a texture in which one of the colors changes with the team of the player). Yet another advantage of the recognition above is to enable locking the color set so it's just determining choice of color for each spot (for instance, to enable a texture of a model to be only red, white, and blue).

Present principles enable the above advantages by changing the neural texturing model from a three channel RGB value to a value-per-color palette, with the highest value at any spot determining which color is selected. Also, the color palette is made to be a trainable parameter so the palette is also generated. This can be locked if a preset palette is desired. Thus, unlike other techniques for using a 2D text-to-image model to generate a 3D model and its texture, present principles, instead of using a field of blended RGB value (so every spot on the 3D model texture can be a unique color), uses a learned palette of colors and a selection from that palette is made for each point on the model.

Accordingly, a method includes establishing, for a neural texturing model, a value-per-color (VPC) palette, with a highest value at a respective location of the neural texturing model determining which color is selected for the respective location. The method includes selecting from the VPC palette a respective color for at least some respective locations on the neutral texturing model.

In some embodiments the method includes generating the value-per-color palette at least in part by making the value-per-color palette to be a trainable parameter such that the value-per-color palette is learned.

If desired, the highest value may be a highest value that is differentiable. The color selected also may be differentiable.

In example implementations the respective locations are associated with respective coordinates, and the method includes converting the respective coordinates to N values, in which N equals the number of colors in the VPC palette. The method can include identifying among the N values for each location a highest value for each location, and based on the respective highest value for each location, selecting from the VPC palette the color for each location on the neutral texturing model.

In other examples the value-per-color palette may not be learned. However, the value-per-color palette may be learned, and the method may include locking the VPC palette after learning so that value-to-color correspondences do not change.

In another aspect, a processor system is configured to, for each of at least some respective locations on a computerized object, input respective coordinates of the respective locations to at least one machine learning (ML) model. The processor system further is configured to receive from the ML model respective colors for the respective locations, and render the object on at least one display using the respective colors for each respective location of the object.

In another aspect, a device includes at least one computer memory that is not a transitory signal and that in turn includes instructions executable by at least one processor system to, for each of at least some respective locations on a computerized object, identify respective coordinates of the respective locations. The instructions are executable to convert each of the respective coordinates of the respective location to respective N values, and use a single one of the N values for each respective location to select a single color for the respective location from a color palette comprising N colors. The instructions are executable to render the computerized object on at least one display in accordance with the respective single colors for each respective location.

The details of the present application, both as to its structure and operation, can be best understood in reference to the accompanying drawings, in which like reference numerals refer to like parts, and in which:

DETAILED DESCRIPTION

Figure 1:
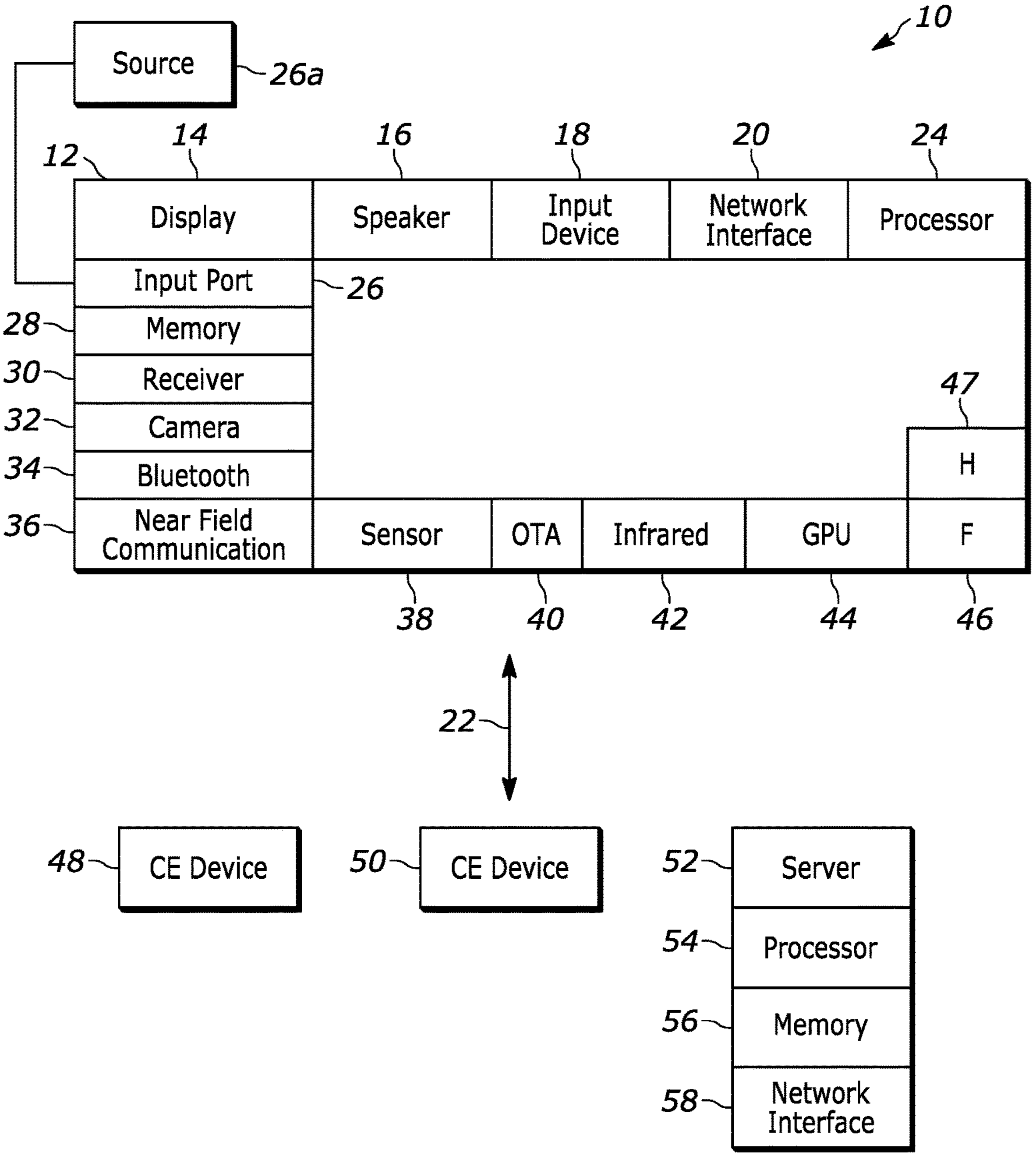
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor system may include one or more processors.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that are configured and weighted to make inferences about an appropriate output.

Figure 2:
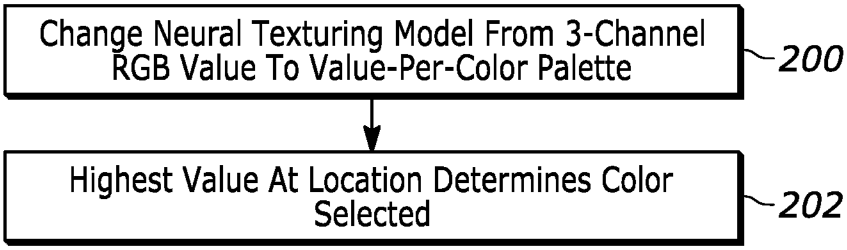
FIG. 2 illustrates present principles in example flow chart format.

FIG. 2 illustrates constraining a texture to a set color palette (rather than full spectrum RGB) for advantages set forth herein. As indicated at state 200, this can be accomplished by changing the neural texturing model from a three-channel RGB value to a value-per-color palette, with the highest value at any spot determining (202) which color is selected. The color palette can be a trainable parameter so the palette is also generated, which can be locked if desired to produce a preset palette.

Figure 3:
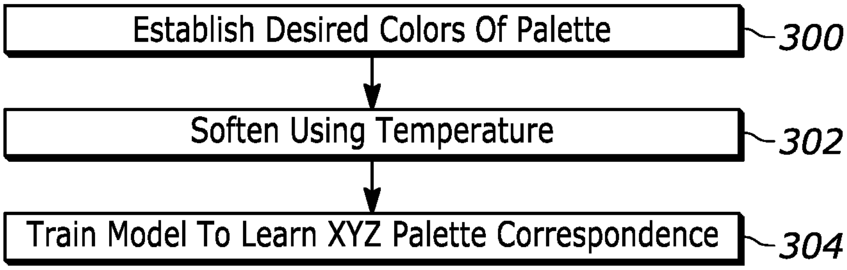
FIG. 3 illustrates example training logic in example flow chart format.

FIG. 3 illustrates at state 300 that a palette is established with desired colors, which may be user-defined or which may be learned. Thus, the colors of the color palette can be learned/optimized or not, so that specific colors of the palette may be specified by a user or a model may be tasked with generating the colors of the palette. In either case, unlike RGB coloring in which R, G, and B are blended responsive to input of an x-y-z position, in a color palette consistent with present principles an x-y-z position is converted to a single unblended color from a menu or table or as output by a ML model.

State 302 indicates that if desired, the number of colors in the palette may be changed and a pseudo-argmax generator "softened" using temperature and use of softmax vs gumbel-softmax. For context, just choosing the channel value that highest (argmax) is not differentiable, so it may be simulated using softmax or gumbel-softmax (as that is differentiable).

More specifically, when finding the highest value, just looking for the absolute highest value may prevent performing gradient descent on the model and colors. To keep the gradient, in example embodiments softmax or gumbel-softmax is used as a differentiable way of finding the highest value that is differentiable. In other words, if the absolute highest value is not differentiable, in some embodiments the next-highest value that is differentiable is selected instead of the absolute highest value.

State 304 indicates that the model is then trained as discussed in further detail herein to convert x-y-z position of a pixel into a single unblended color for the pixel using the color palette.

Figure 4:
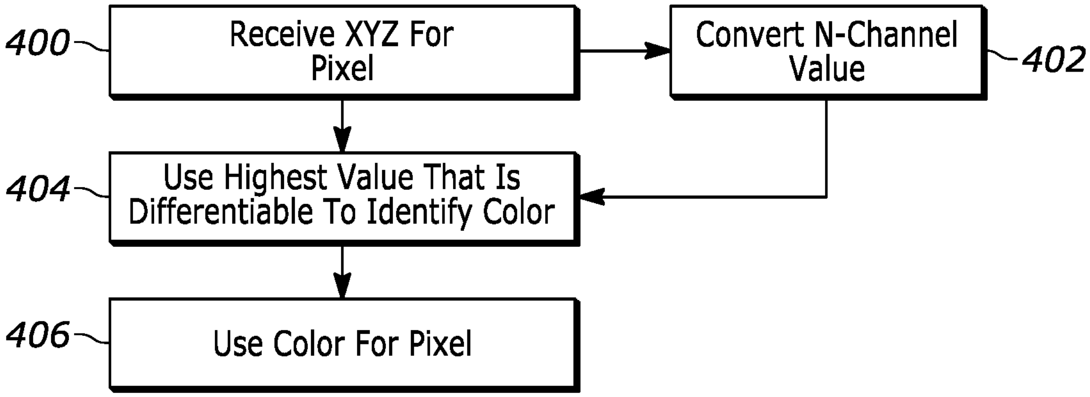
FIG. 4 illustrates example detailed logic in example flow chart format.

FIG. 4 illustrates use of the trained model to apply color to textures. Commencing at state 400, an x-y-z location, e.g., of a pixel of an object to be rendered in color, is identified. The x-y-z location is converted at state 402 to a value, in some cases plural values for respective N channels such as three channels or five channels or however many colors are in the palette.

Moving to state 404, the highest of the values from state 402, in some cases the highest differentiable value, is used to derive a single color from the palette. This color may be from a table lookup or it may be determined by a trained model. State 406 indicates that the pixel is rendered in the color identified at state 404. The model may be, e.g., a neural network such as a Multilayer Perceptron with positional encoding of the object to be rendered.

Figure 5:
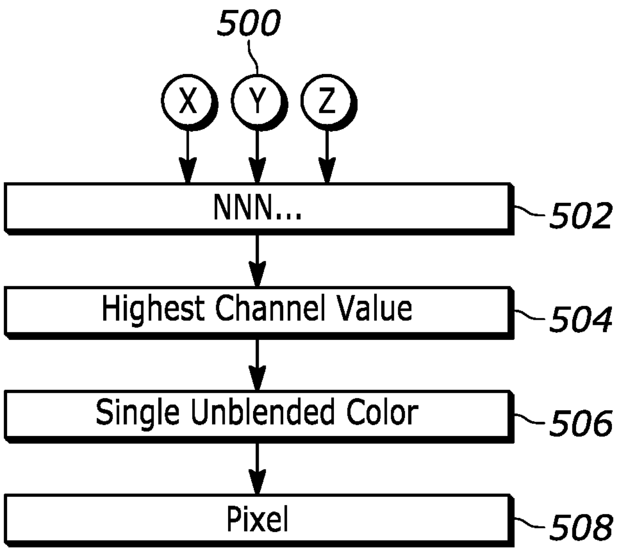
FIG. 5 illustrates example data flow architecture consistent with present principles.

FIG. 5 illustrates the above. A location 500, e.g., of a pixel in three dimensional space (x-y-z coordinates for example, it being understood that other 3D coordinate systems such as polar or spherical may be used) is processed by a ML model 502 to render a value of each of N channels that correspond to N colors in the palette. The highest of the N values 504 is correlated to a single unblended color 506 that is used to render the pixel 508 corresponding to the location 500.

Figure 6:
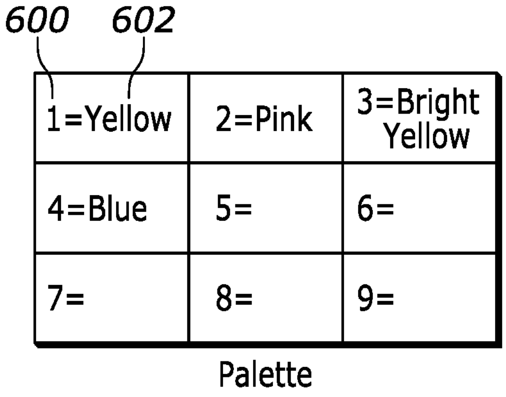
FIG. 6 illustrates an example color palette correlating values with colors.

FIG. 6 illustrates an example correlation data structure that correlates values 600 to colors 602.

Figure 7:
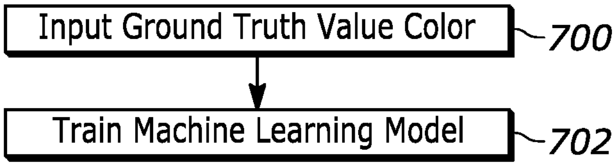
FIG. 7 illustrates further example training logic consistent with present principles.

FIG. 7 illustrates example training for a ML model that learns a color palette. The color palette is set to random at state 700 and at state 702 backpropagation is allowed to affect those values.

Figure 8:
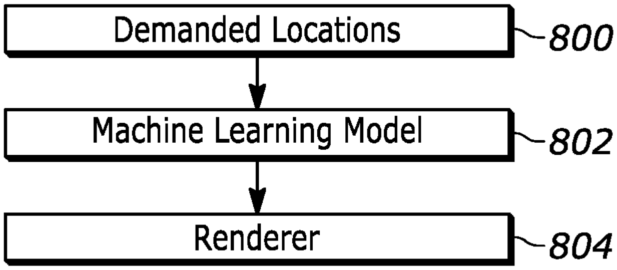
FIG. 8 illustrates an example architecture consistent with present principles.

FIG. 8 captures the general architecture related to above disclosure. Demanded pixel locations 800 are fed into a ML model 802 that outputs the colors for each pixel to a renderer 804.

Figure 9:
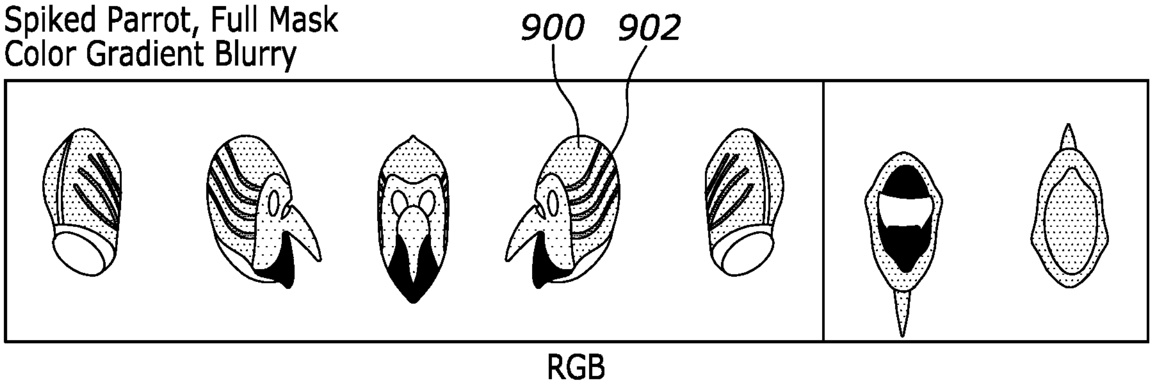
FIGS. 9 and 10 illustrate an example object (a face mask in the example shown) respectively rendered using RGB coloring and color palette coloring consistent with present principles.
Figure 10:
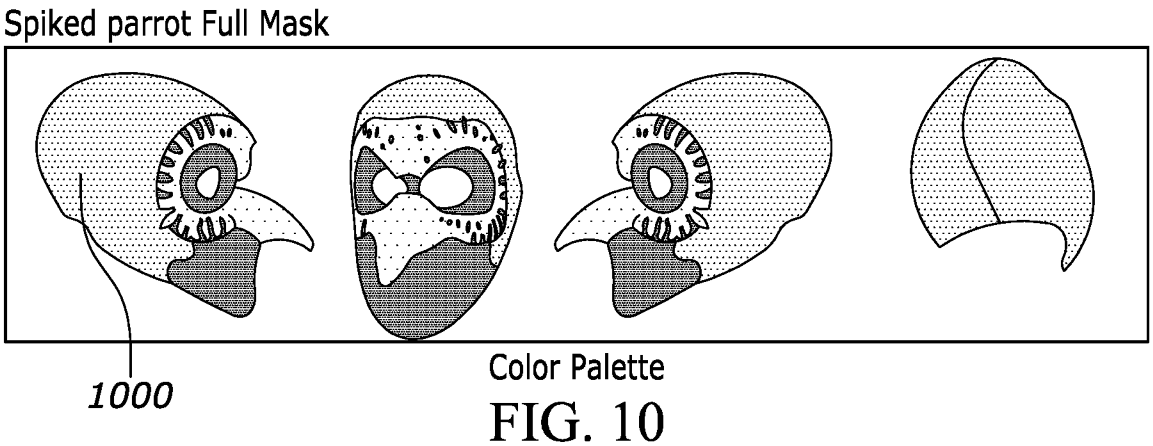

FIGS. 9 and 100 illustrate the difference in output between RGB rendering and present color palette rendering. In FIG. 9, an object, in the example shown, a mask of a parrot with a spiked beak, is rendered using RGB techniques to result, among other things, in a head with multiple lines 900, 902 of different colors. Ion contrast, with the color palette technique the same object is rendered with a head in only one color 1000. The color of the palette can be changed to mimic the colors of sports teams, etc.

Below is pytorch code for the neural network model that takes an XYZ position and returns an RGB value and that can be modified to instead use the XYZ position to output a color from a color palette:

```
def gumbel_softmax(logits, temperature=0.1):
  gumbel_noise=−torch.log(−torch.log(torch.rand_like
    (logits)))
  return F.softmax((logits+gumbel_noise)/temperature,
    dim=1)
class texture_nn(nn.Module):
  def_init_(
    self,
    encoder_type="hashgrid",
    symmetry=True,
    use_gumbel=True,
    temperature=0.1,
    color_count=7,
  ):
    super( )._init_( )
    num_layers=1
    hidden_dim=64
    encoder, in_dim=get_encoder(
      encoder_type, input_dim=3, desired_resolu-
        tion=4096, symmetry=symmetry
    )
    self.encoder=encoder.cuda( )
    self.in_dim=in_dim
    self.colors=torch.nn.Parameter(torch.rand((color-
      _count, 3)).cuda( )
    self.sigma_net=MLP(
      in_dim, color_count, hidden_dim, num_layers,
        bias=False
    ).cuda( )
    self.params=[
      {"params": self.encoder.parameters( ), "lr": le-2},
      {"params": self.sigma_net.parameters( ), "lr":
        le-2},
      {"params": self.colors, "lr": le-1},
    ]
    self.use_gumbel=use_gumbel
    self.temperature=temperature
  def forward(self, x):
    x=contract_to_unisphere(x)
    enc=self.encoder(x, bound=1.0)
    o=self.sigma_net(enc)
    if self.use_gumbel:
      softmax_scores=gumbel_softmax (o,
        temperature=self.temperature)
    else:
      softmax_scores=F.softmax (o/self.temperature,
        dim=1)
    expanded_colors=F.sigmoid(self.colors.unsqueeze
      (0).expand(o.shape [0], −1, −1))
    result=torch.sum(softmax_scores.unsqueeze(−1)
      *expanded_colors, dim=1)
    return result
```

While the particular embodiments are herein shown and described in detail, it is to be understood that the subject matter which is encompassed by the present invention is limited only by the claims.

What is claimed is:

1. A method comprising:

establishing, for a neural texturing model, a value-per-color (VPC) palette, with a highest value at a respective location of the neural texturing model determining which color is selected for the respective location;

providing, as input to the neural texturing model, a coordinate representing a location on a computerized object; and selecting, based on output from the neural texturing model processing the coordinate representing the location on the computerized object as input and from the VPC palette, a respective color for the location on the computerized object, the method comprising:

converting the coordinate to N values, wherein N equals the number of colors in the VPC palette;

identifying among the N values for the location a highest value for the location; and based on the respective highest value for the location, selecting from the VPC palette the color for the location on the neural texturing model.

2. The method of claim 1, comprising:

generating the VPC palette at least in part by making the VPC palette to be a trainable parameter such that the VPC palette is learned.

3. The method of claim 1, wherein the highest value is a highest value that is differentiable.

4. The method of claim 1, wherein the VPC palette is not learned.

5. The method of claim 1, wherein the VPC palette is learned and the method comprises:

locking the VPC palette after learning so that value-to-color correspondences do not change.

6. A device comprising:

at least one computer memory that is not a transitory signal and that comprises instructions executable by at least one processor system to:

for each of at least some respective locations on a computerized object, identify respective coordinates of the respective locations;

provide each of the respective coordinates as input to a machine learning (ML) model trained to output one or more colors based on a coordinate of the computerized object as input;

convert, using output of the ML model processing the respective coordinates as input, each of the respective coordinates of the respective locations to respective N values;

use a single one of the N values for each respective location to select a single color for the respective location from a color palette comprising N colors; and cause the computerized object to be rendered on at least one display in accordance with the respective single colors for each respective location.

7. The device of claim 6, comprising the at least one processor system.

8. The device of claim 6, comprising the at least one display.

9. The device of claim 6, wherein the instructions are executable to:

for each of the N values for a respective location, identify a highest one of the values; and use the highest one of the values for each respective location to select the single color for the respective location from the color palette.

10. The device of claim 9, wherein the highest value is a highest absolute value from the respective N values.

11. The device of claim 9, wherein the highest value is a highest differentiable value from the respective N values.

12. The device of claim 6, wherein the color palette is not learned.

13. The device of claim 6, wherein the color palette is learned.

14. The device of claim 13, wherein the instructions are executable to:

lock the color palette after learning so that value-to-color correspondences do not change.

* * * * *